United States Patent [19]

Darland

[11] Patent Number: 4,580,009

[45] Date of Patent: Apr. 1, 1986

[54] TELEPHONE MOUTHPIECE MODULAR COUPLER

[75] Inventor: Michael L. Darland, King County, Wash.

[73] Assignee: The Microperipherel Corporation, Redmond, Wash.

[21] Appl. No.: 608,330

[22] Filed: May 8, 1984

[51] Int. Cl.⁴ ............................................ H04M 11/00
[52] U.S. Cl. .................................................. 179/2 C
[58] Field of Search .................... 179/2 C, 2 DP, 178; 339/28, 29 R, 29 B

[56] References Cited

U.S. PATENT DOCUMENTS 3,277,243 10/1966 Fairbairn ........................... 179/2 DP
4,341,926  7/1982 Chester ............................... 179/2 C
4,362,905 12/1982 Ismail ................................. 179/178

OTHER PUBLICATIONS

Suttle Apparatus Corporation advertisement, Apr. 1978.

*Primary Examiner*—W. J. Brady
*Attorney, Agent, or Firm*—Seed and Berry

[57] ABSTRACT

A telephone mouthpiece modular coupler for directly connecting a modular telephone line cord to a conventional non-modular telephone unit having electrical contacts and a telephone handset. A substantially cylindrical, flexible coupler cup containing center and annular electrical coupler contacts and a modular line jack is provided. The coupler cup is removably attachable to a mouthpiece portion of a telephone handset. When attached, the center and annular coupler contacts create electrical connections to electrical contacts of the telephone mouthpiece. The modular line cord can be connected at one end to the clip receptacle of a direct connect modem, and at an opposite end to the modular line jack of the modular coupler, directly connecting the modem to the telephone system without using a bulky and relatively inefficient acoustical coupler device.

24 Claims, 7 Drawing Figures

U.S. Patent   Apr. 1, 1986   Sheet 1 of 2   4,580,009
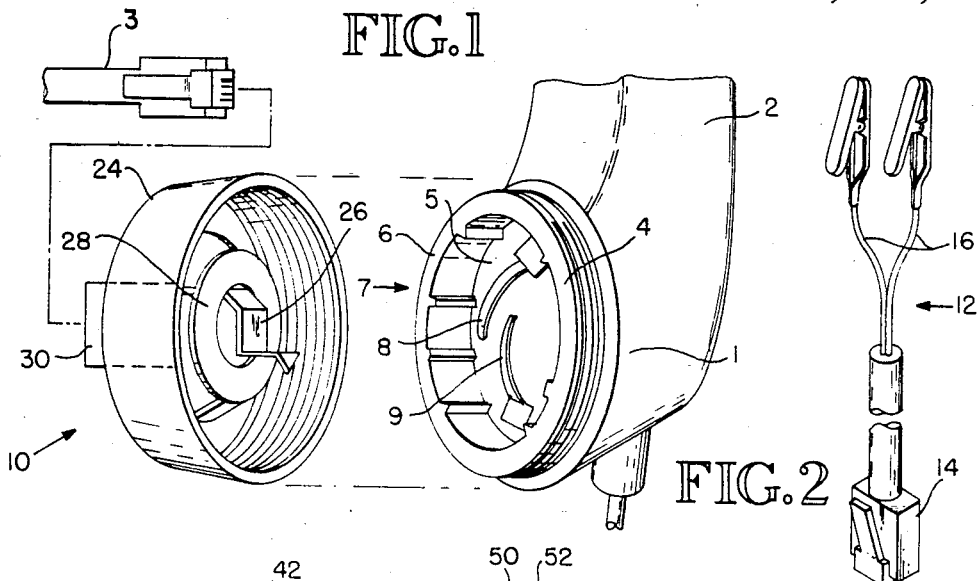
FIG. 1
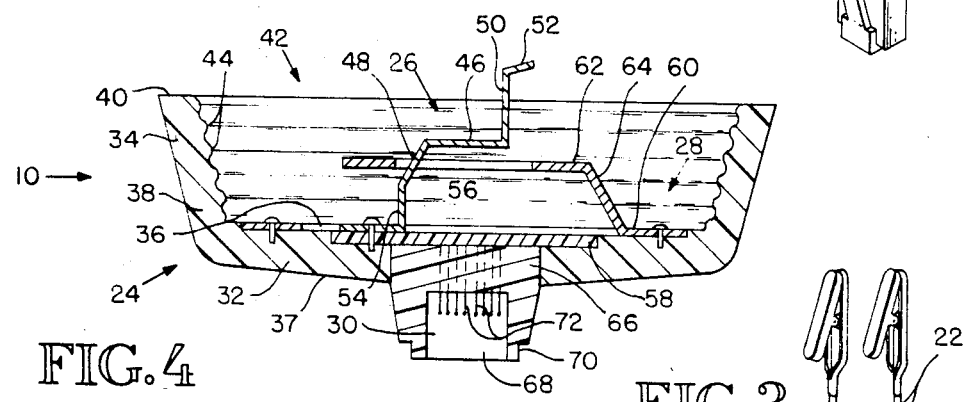
FIG. 2
FIG. 4
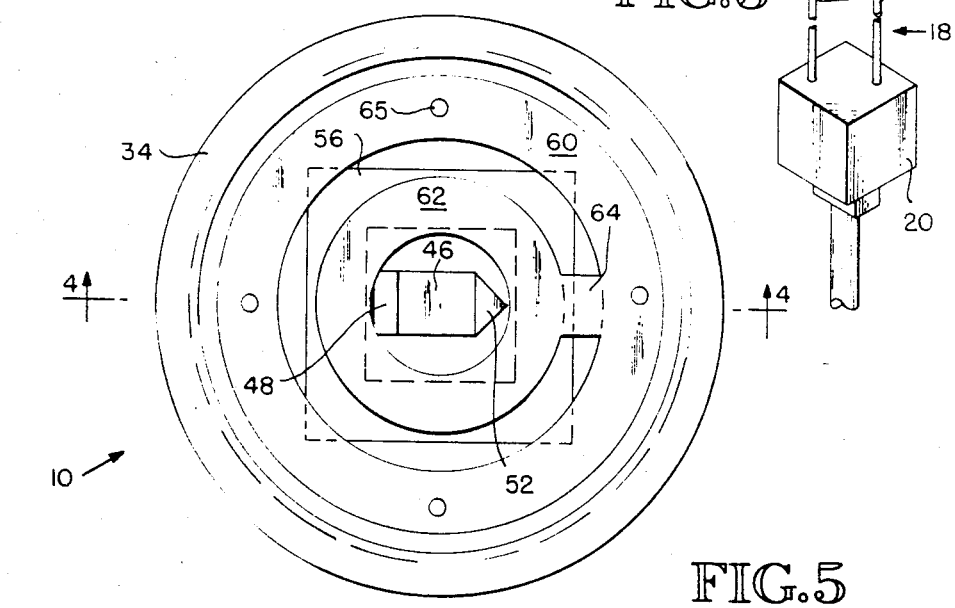
FIG. 3
FIG. 5

TELEPHONE MOUTHPIECE MODULAR COUPLER

DESCRIPTION

1. Technical Field

This invention relates to data communications equipment, and more particularly, to a telephone coupler capable of directly connecting data communications equipment having a modular telephone connection to a non-modular telephone system.

2. Background Art

Personal computers are becoming increasingly popular, particularly those which can communicate over the telephone networks with other computers in remote locations. Such remote data communications require the use of a communications modem as an interface between the portable personal computers internal data bus and the telephone system. Many modems sold today are designed to be connected directly to the telephone system through the use of a standard telephone line modular clip, which is inserted into a matching clip receptacle connected to the telephone system. Such direct-connect type modems can operate at faster data transmission rates with greater accuracy than the older type modems, which rely on acoustic couplers to convert electrical signals from the modem into acoustic signals directed into the mouthpiece microphone of a telephone handset. Acoustic-type modems are generally capable of transmitting at up to 300 baud, or approximately 30 characters per second, while direct-connect-type modems can transmit as high as 9600 baud, or approximately 960 characters per second. This fourfold increase in transmission rate is due to an improvement in signal strength of 20 decibels or more in direct-connect modems, which do not require inefficient accoustic-/electrical signal conversion equipment. A further advantage of direct-connect modems is their smaller size and increased portability, since they do not require bulky acoustic signal conversion equipment.

Most direct-connect type modems sold today can only be connected to modular telephone systems, through a conventional modular clip receptacle manufactured as part of the modem. Although the use of modular telephone lines and equipment is increasing, there are still many areas of the United States in which telephones are wired directly into the system, without the use of modular clips. Hotels, in particular, often use hard-wired telephones to discourage theft. Moreover, modular telephone equipment is rare outside North America. Thus, portable personal computers cannot be used for remote data communications in areas having hard-wired telephone systems.

Recent articles published in magazines serving personal computer users point out this need dramatically. Writing in the Apr. 2, 1984 issue of *InfoWorld*, Jim Bartimo states that "Acoustic couplers limit most baud rates to 300 and increase the cost of the device with the need for a speaker and microphone. You still need an acoustic coupler while on the road because hotels discourage theft by using telephones without modular jacks, but now direct-connect modems allow a baud rate of 1,200 and dialup capabilities through the computer keyboard." Dr. Anthony P. Trippe, writing in the February 1984 issue of *Portable Computer*, writes that four of five hotels visited during a single business trip had "hard-wired," non-modular telephones in their guest rooms. Clearly, there is a need for a device capable of directly connecting a modular telephone line cord such as is connected to a direct-connect-type modem, to a "hard-wired," non-modular telephone system.

A device or method for connecting a modular telephone line cord to a non-modular telephone system must be usable with most models of conventional non-modular telephone units, such as those manufactured by Bell, GTE, and ITE. Otherwise, users would forced to obtain and use a customized device for each model of telephone system or handset encountered. A universal device capable of easy attachment to any of a number of conventional telephone units is required.

DISCLOSURE OF THE INVENTION

The present invention resides in a telephone handset modular coupler for directly connecting a modular telephone line cord, such as is connected to a direct-connect type data communications modem, to a conventional, nonmodular telephone handset, such as is manufactured by Bell, GTE, and ITE, comprising a line cord attachment means for attaching a modular line cord to the modular coupler device, connecting means for creating electrical connections between two or more conductors of the line cord and two or more electrical contacts of the telephone handset, and handset attachment means for removably attaching the modular coupler device to a mouthpiece of the telephone handset.

The handset attachment means comprises a coupler cup having a cup base and a substantially cylindrical cup wall rigidly attached to the cup base and frictionally attachable to an exposed mouthpiece shell of the telephone handset. The coupler cup is manufactured from a flexible material having a high coefficient of friction, such as "Kraton" TM. The cup wall is flared toward an open end of the coupler cup to create a progressively firmer frictional connection between the cup wall and the mouthpiece shell.

The connecting means comprises first and second coupler contacts positioned substantially interior of the coupler cup. The first coupler contact is a center contact having a first center contacting element positioned substantially parallel to the cup base at a predetermined distance from the cup base toward the open end of the coupler cup, and supported in that position by a center support rigidly attached to the center contacting element and extending between the center contacting element and the cup base. A second center contacting element extends a predetermined distance from the first center contacting element toward the open end of the coupler cup and terminates in a flat, triangular portion oriented at a predetermined angle to the longitudinal axis of the coupler cup. The center of the first center contacting element is positioned substantially along the longitudinal axis of the coupler cup. The first and second center contacting elements allow the same modular coupler to be used with multiple models of multiple models of telephone handsets having mouthpiece contacts positioned non-uniformly in the mouthpiece shell. The first and second center contacting elements and the center support are integrally fabricated as the center contact from a single piece of conducting metal, such as aluminum, for ease of manufacturing and assembly.

In a presently preferred embodiment, the second coupler contact is an annular contact having a first annular contacting element positioned adjacent and substantially parallel to the cup base, and a second annular contacting element positioned substantially parallel to the cup base at a predetermined distance from the cup base toward the open end of the coupler cup. The annular design of the second coupler contact ensures that electrical connections will be established between the coupler and mouthpiece contacts without regard to the rotational orientation of the coupler around its longitudinal axis. The second annular contacting element is supported by a cantilevered support rigidly attached to and connecting the first and second annular contacting elements. The interior and exterior diameters of the first annular contacting element are greater than the interior and exterior diameters, respectively, of the second annular contacting element. The first and second annular contacting elements and the cantilevered support are integrally fabricated as the annular contact from a single piece of conducting material, such as aluminum, for ease of manufacturing and assembly.

In an alternatively preferred embodiment, the second coupler contact is a bell-shaped annular contact having a first annular contacting element positioned adjacent and substantially parallel to the cup base, and a second annular contacting element positioned substantially parallel to the cup base at a predetermined distance from the cup base toward the open end of the coupler cup. The second annular contacting element is supported by a continuous annular support having substantially the shape of a conical section, and rigidly attached to and connecting the first and second annular contacting elements. Again, the interior and exterior diameters of the first annular contacting element are greater than the interior integrally fabricated as the annular contact from a single piece of conducting material, such as aluminum or copper, for ease of manufacturing and assembly.

The first and second annular contacting elements allow the same modular coupler to be used with multiple models of telephone handsets having mouthpiece contacts positioned non-uniformly within the mouthpiece shell. The line cord attachment means is a conventional modular line jack, positioned with the longitudinal axis of a clip receptacle of the modular line jack substantially coaxial with the longitudinal axis of the coupler cup, and with the clip receptacle positioned exterior of the cup base. In an alternatively preferred embodiment, cup flanges of the coupler cup positioned adjacent opposite sides of the modular line jack hold the modular line jack securely in place. A contact base plate having electrically conducting paths connecting contact pins of the modular line jack to the first and second coupler contacts is positioned adjacent to the cup base. For ease of assembly, the modular line jack, contact base plate, and the center coupler contact are preassembled into a single unit.

A first alternative embodiment of this invention is capable of directly connecting a clip receptacle of a direct-connect type data communications modem to the mouthpiece contacts of a telephone handset. The first alternative embodiment resides in a conventional modular clip having contact pins which create electrical connections with predetermined electrical conductors in the clip receptacle of the modem, and two or more electrical conductors, each attached at one end to a predetermined contact pin of the modular clip, and terminating at an opposite end in an electrical connector, such as an alligator clip, capable of attachment to an electrical contact of the telephone mouthpiece. Such an embodiment provides the direct electrical connection characteristic of this invention without requiring additional equipment.

A second alternative embodiment of this invention connects a modular telephone line cord, such as is connected to a direct-connect type modem, to the mouthpiece contacts of the telephone handset using a standard modular line jack having two contact pins which create electrical connections with two predetermined conductors of the telephone line cord, and two electrical conductors, each attached at one end to predetermined contact pins of the modular line jack, and terminating at an opposite end in electrical connectors, such as alligator clips, capable of removable attachment to the electrical contacts of a telephone handset.

Other features and advantages of the present invention will become apparent from the following detailed description, taken in conjunction with the accompanying drawings.

BRIEF DESCRIPTION OF THE DRAWINGS

FIG. 1 is an isometric view of the presently preferred embodiment of the telephone mouthpiece modular coupler of this invention, shown in relation to the mouthpiece of a typical telephone handset.

FIG. 2 shows a first alternative embodiment of the modular coupler of this invention, comprising two flexible electrical conductors directly attached to a modular telephone clip.

FIG. 3 shows a second alternative embodiment of the modular coupler of this invention, comprising a modular line jack and two flexible electrical conductors attached thereto.

FIG. 4 is a detailed sectional view of the presently preferred embodiment of FIG. 1, showing the coupler cup, the center coupler contact, the ring-shaped annular coupler contact and the modular line jack.

FIG. 5 is a plan view of the embodiment of FIG. 1, looking into the coupler cup.

BEST MODE FOR CARRYING OUT THE INVENTION

Figure 6:
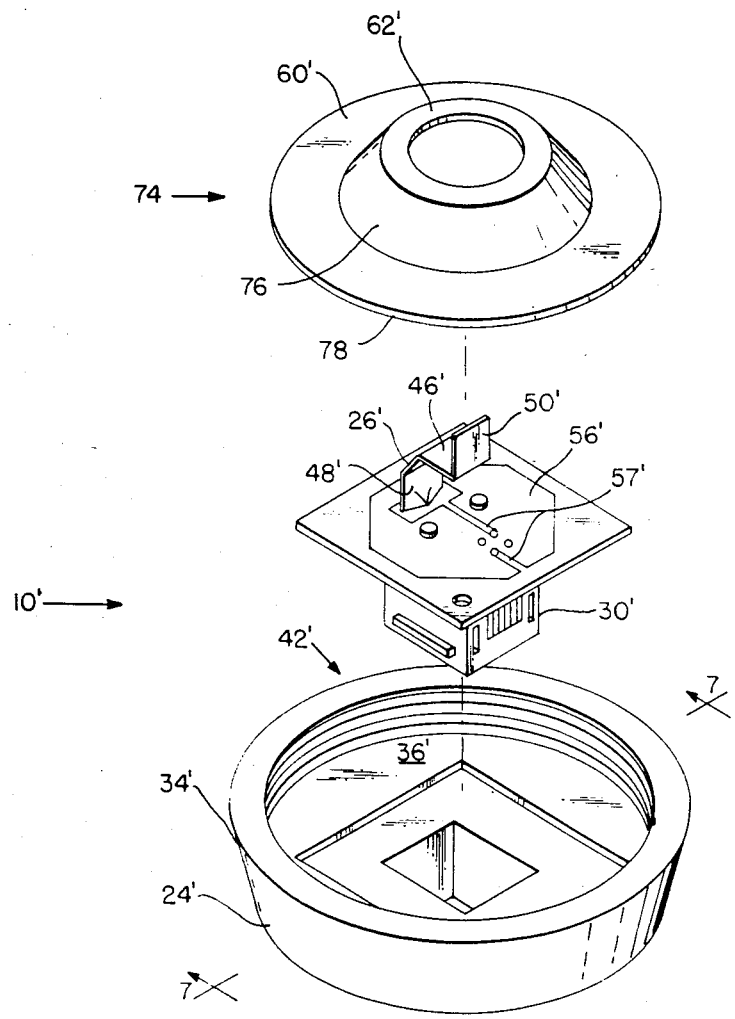
FIG. 6 is an exploded isometric view of the alternative preferred embodiment of this invention.

As shown in FIG. 1, the modular coupler 10 of the presently preferred embodiment of this invention attaches to an uncovered telephone mouthpiece 1 of a telephone handset 2, producing a direct connection between one or more electrical contacts of the telephone handset and one or more corresponding conductors of a modular telephone line cord 3 connectable to a direct-connect type data communications modem (not shown).

Although the preferred embodiments of the modular coupler 10 of this invention attach to the mouthpiece 1 of the telephone handset 2, other means of directly connecting the conductors of a modular telephone device to contacts of the telephone handset are possible. A first alternative embodiment 12 of the modular coupler of this invention, as shown in FIG. 2, directly connects the conductors of a clip receptacle, such as is part of a direct-connect type modem (not shown), to the telephone handset. The first alternative embodiment 12 comprises a modular clip 14 and two flexible electrical conductors 16 connected at one end to predetermined contact pins of the modular clip, and having standard electrical connectors, such as alligator clips, attached to the opposite free end of each flexible electrical conductor.

A second alternative embodiment 18, shown in FIG. 3, comprises a standard modular telephone line jack 20 and two flexible electrical conductors 22, each connected at one end to two predetermined contact pins of the modular line jack, and having standard electrical connectors, such as alligator clips, attached to the opposite free end of each flexible electrical conductor. The electrical connectors 16 and 22 are removable attachable to the electrical contacts of the telephone handset.

As shown in FIG. 1, electrical contacts of the telephone handset 2 can be located in both the mouthpiece 1 and earpiece portions (not shown) of the handset. Access to the telephone handset contacts will usually be achieved through the telephone mouthpiece 1, which generally allows the connections to the handset contacts to be made more easily, by merely removing a protective cover (not shown) and an accoustic microphone (not shown) from the mouthpiece, exposing the electrical contacts.

A typical telephone mouthpiece 1 terminates in a hollow, substantially cylindrical mouthpiece shell 4, having circumferential threads on its exterior surface which engage circumferential threads on the interior surface of a protective mouthpiece cover (not shown). A substantially flat mouthpiece base 5 is positioned interior of the mouthpiece shell 4. A circumferential edge surface 6 of the mouthpiece shell 4 defines an open end of the mouthpiece shell. A first mouthpiece contact 8 and a second mouthpiece contact 9 are positioned interior of the mouthpiece shell 3. A conventional arrangement for the first and second mouthpiece contacts 8 and 9 is shown in FIG. 1.

Both the first mouthpiece contact 8 and the second mouthpiece contact 9 are fixedly attached to the mouthpiece base 5 and extend upwardly in a cantilevered fashion, terminating in free contact ends. Typically, the contact end of the first mouthpiece contact 8 is positioned substantially along a longitudinal axis of the cylindrical mouthpiece shell 4 at a preset distance from the mouthpiece base 5 toward the open end 7. The contact end of the second mouthpiece contact 9 is typically offset laterally from the longitudinal axis of the mouthpiece shell 4 toward the wall of the mouthpiece shell, again at a preset distance from the mouthpiece base 5 toward the open end of the mouthpiece shell 7.

When the mouthpiece 1 is used normally as an acoustic speech transmission device, the contact ends of the first mouthpiece contact 8 and second mouthpiece contact 9 make electrical connections to an accoustic microphone (not shown) positioned at the open end of the mouthpiece shell 7. The microphone is held in place against the contact ends of the first mouthpiece contact 8 and second mouthpiece contact 9 by a mouthpiece cover (not shown).

When the telephone mouthpiece modular coupler 10 is used to directly connect the modular telephone line cord 3 to the telephone handset 2, the mouthpiece cover and microphone are removed from the mouthpiece 3, and the modular coupler 10 is removable attached to the mouthpiece. A longitudinal axis of the substantially cylindrical modular coupler 10 is aligned with the longitudinal axis of the mouthpiece shell 4, and an interior circumferential surface of a substantially cylindrical coupler cup 24 frictionally contacts the exterior circumferential surface of the cylindrical mouthpiece shell 4.

In both the presently preferred embodiment and the alternatively preferred embodiment of this invention, first and second electrically conducting coupler contacts, comprising a center contact 26 and an annular contact 28, are positioned interior of the substantially cylindrical coupler cup 24. The center contact 26 and annular contact 28 are electrically connected to a modular line jack 30. When the modular coupler 10 is attached to the telephone mouthpiece 1, the center coupler contact 26 and the annular coupler contact 28 make direct electrial connections with the contact ends of the first mouthpiece contact 8 and second mouthpiece contact 9, respectively, of the telephone mouthpiece. With the modular coupler 10 thus attached to the mouthpiece 1, the user's data processing equipment is directly connected to the local telephone system through the telephone 2 handset without using an acoustic coupler or requiring a second telephone modular line jack directly connected to the local telephone system.

In the presently preferred embodiment, shown in FIG. 4, the coupler cup 24 consists of a cup base 32 and a substantially cylindrical cup wall 34. The circular disc-like cup base 32 has an interior surface 36 and an exterior surface 37. The cup wall 34 has a first circumferential edge surface 38 by which it is rigidly attached to a perimeter portion of the interior surface 36 of the cup base 32. A second opposite circumferential edge surface 40 of the cup wall 34 defines an open end 42 of the coupler cup.

The cup wall 34 is flared outward toward the open end 42 of the coupler cup 24, with the diameter of an exterior circumference of the cup wall 34 at the open end being greater than the diameter of the cup base 32. The flared cup wall 34 works to create a strong frictional connection between the interior surface of the cup wall and the exterior surface of the mouthpiece shell 4 as the modular coupler 10 is attached to the telephone mouthpiece 1.

The coupler cup 24, comprising the cup base 32 and cup wall 34, is integrally fabricated as a single unit. The use of a flexible rubber-type material, such as "Kraton" TM, for the coupler cup 24 allows the cup wall 34 to stretch in order to accommodate varying sizes of mouthpiece shells 4. The use of material having a relatively high coefficient of friction in the cup wall 34 increases the strength of the frictional connection between the interior surface of the cup wall and the exterior circumferential surface of the telephone mouthpiece shell 4.

The frictional connection between the cup wall 34 and the mouthpiece shell 4 can be further enhanced by the placement of concentric circumferential ribs 44 around the interior surface of the cup wall 34, positioned at intervals from the cup base 32 toward the open end 42. The use of flexible cup walls 34, or "muffs," and of concentric circumferential ridges 44 is well known in the art of acoustic coupler design.

The first and second coupler contacts of the presently preferred embodiment are positioned interior of the cup wall 34, substantially between the cup base 32 and the open end 42. The center coupler contact 26 is positioned substantially along the longitudinal axis of the coupler cup 24, making an electrical connection to the first mouthpiece contact 8, which is typically positioned along the longitudinal axis of the mouthpiece shell 4. The center contact 26 has a first center contacting element 46 positioned at a preset distance from the cup base 32 toward the open end 42. The first center contacting element 46 is supported above the cup base 32 by a flat, substantially rectangular center support 48. The center support 48 is rigidly attached to the first center contacting element 46 and extends downwardly from the first center contacting element toward the cup base 32.

A second center contacting element 50 extends from an edge of the first center contacting element 46 perpendicularly toward the open end 42. At a predetermined distance from the point of attachment to the first center contacting element 46, the second center contacting element 50 is bent away from the longitudinal axis of the coupler cup 24 toward the cup wall 34, creating an angled portion 52. An extreme end of the angled portion 52 terminates in a single point, giving the angled portion a substantially triangular shape.

For ease of manufacturing, the first and second center contacting elements 46 and 50 and the center support 48 are integrally fabricated as the center contact 26 from a single flat strip of conducting material, such as aluminum.

An attached end 54 of the center support 48 can be fixedly attached directly to the cup base 32. However, in the presently preferred embodiment, the attached end 54 is fixedly attached to a contact base plate 56. The contact base plate 56 is a flat, substantially square insulating substrate material upon and through which electrically conducting paths can be formed. The contact base plate 56 provides a convenient means of forming electrical connections between the center and annular contacts 26, 28 and the modular line jack 30. Such insulating substrate materials, or "PC boards," are well known in the electrical arts.

The contact base plate 56 is positioned adjacent and substantially parallel to the interior surface 36 of the cup base 32, and has an interior surface facing the open end 42, and an opposite embedded surface 58. The embedded surface 58 is fixedly attached to the modular line jack 30. To simplify the manufacturing process, the center contact 26, contact base plate 56 and modular line jack 30 are preassembled into a integral unit before attachment to the coupler cup 24.

The second coupler contact of the presently preferred embodiment is an annular contact 28 comprising one or more flat, ring-like annular contacting elements positioned substantially parallel to the cup base 32. A first annular contacting element 60, having an exterior diameter substantially equal to an interior diameter of the cup wall 34 at a point where the cup wall is rigidly attached to the cup base 32, is positioned adjacent to the cup base. A second annular contacting element 62 is positioned at a predetermined distance from the cup base 32 toward the open end 42. The second annular contacting element 62 is supported in cantilever fashion by a flat, substantially rectangular, cantilevered support arm 64. A first end of the support arm 64 is rigidly attached to an exterior circumferential edge of the second annular contacting element 62, and extends downward therefrom toward the cup base 32. A second opposite end of the support arm 64 is rigidly attached to an interior circumferential edge of the first annular contacting element 60. Centers of the first and second annular contacting elements 60 and 62 are positioned substantially along the longitudinal axis of the coupler cup 24.

The interior diameters of the first and second annular contacting elements 60 and 62 are such that interior circumferential edges of the annular contacting elements are separated from the center contact 26. This separation is essential to the prevention of unintended shortcircuits between the center and annular contacts 26 and 28 which would render the modular coupler 10 inoperable.

As seen in FIG. 5, the annular contact 28 is fixedly attached to the cup base 32 by four rivet-type fasteners 65, attaching the first annular contacting element 60 to the interior surface 36 of the cup base. For ease of manufacturing, the first and second annular contacting elements 60 and 62 and the support arm 64, are integrally fabricated as the annular contact 28 from a single piece of conducting material, such as aluminum.

The modular line jack 30 of the presently preferred embodiment is attached to the exterior surface of the cup base 20 and positioned substantially along the longitudinal axis of the coupler cup 24. A base end 66 of the modular line jack 30 is fixedly attached to the embedded surface 58 of the contact base plate 56. The modular line jack 30 has a standard modular clip receptacle 68 for receiving a modular clip of the modular line cord 3. The clip receptacle 68 is positioned in an exposed end 70 of the modular line jack 30 opposite the base end 66. Although the clip receptacle 68 could be designed to accept any standard modular line clip, the presently preferred embodiment of the modular coupler 10 is designed to accept a RJ11-type modular line clip.

Two or more contact pins 72 in the clip receptacle 68 make electrical connections to conductors of the telephone line cord 3 exposed by the modular clip of the line cord. The contact pins 72 extend from the modular line jack 30 through the contact base plate 56 for connection with the conducting paths of the contact base plate. A first conducting path on the contact base plate 56 connects a predetermined first contact pin of the modular line jack 30 to the center support 48 of the center contact 26. A second conducting path on the contact base plate 56 connects a predetermined second contact pin of the modular line jack 30 to the first annular contacting element 60 of the annular contact 28.

In an alternatively preferred embodiment of the modular coupler 10' of this invention, shown in FIG. 6, the second coupler contact is an annular contact 28' comprising a single bell-shaped element having first and second annular contacting surfaces 60' and 62'. The coupler cup 24' consists of a cup base 32' and a cup wall 34'. The cup base 32' has an interior surface 36'. The cup wall 34' has a circumferential edge surface 40' defining an open end 42' of the coupler cup 24'.

The cup wall 34' is flared outward toward the open end 42' of the coupler cup 24', creating a strong frictional connection between the interior surface of the cup wall and the exterior surface of the mouthpiece shell 4 as the modular coupler 10' is attached to the telephone mouthpiece 1.

The cup base 32' and cup wall 34' are integrally fabricated as the coupler cup 24' from a flexible rubbertype material, such as "Kraton" TM. Concentric, circumferential ribs 44' around the interior surface of the cup wall 34' to improve frictional connection between the cup wall and the mouthpiece shell 4.

The first and second coupler contacts of the alternatively preferred embodiment are positioned interior of the cup wall 34', substantially between the cup base 32' and the open end 42'. The center coupler contact 26' is positioned substantially along the longitudinal axis of the coupler cup 24. The center contact 26' has a first center contacting element 46' positioned at a preset distance from the cup base 32' toward the open end 42'. The first center contacting element 46' is supported by a flat, substantially rectangular center support 48'. A second center contacting element 50' extends from an edge of the first center contacting element 46' perpendicularly toward the open end 42'. The second center contacting element 50' is a flat, substantially rectangular element.

For ease of manufacturing, the first and second center contacting elements 46' and 50' and the center support 48' are integrally fabricated as the center contact 26' from a single flat strip of conducting material, such as aluminum.

In the alternatively preferred embodiment, the center support 48' is fixedly attached to a contact base plate 56'. The contact base plate 56' is a flat, substantially square insulating substrate material upon and through which electrically conducting paths 57 can be formed. Such insulating substrate materials, or "PC boards," are well known in the electrical arts.

Figure 7:
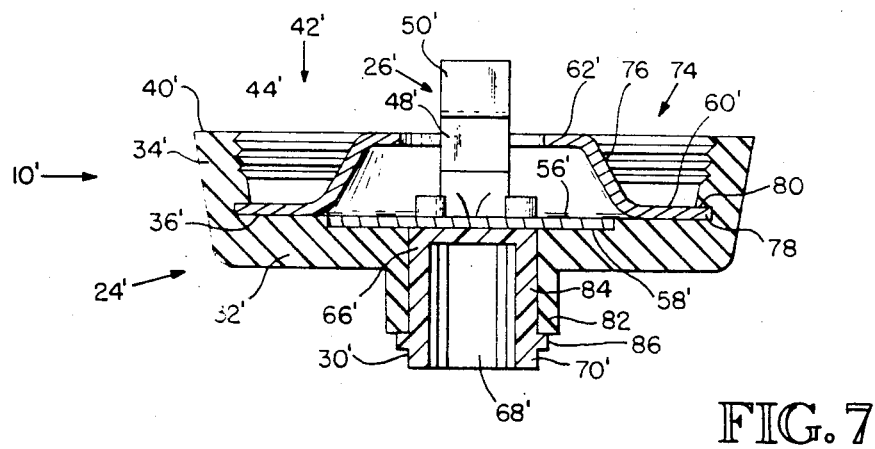
FIG. 7 is a detailed sectional view of the alternative preferred embodiment of FIG. 6, showing the coupler cup, the center coupler contact, the bell-shaped annular coupler contact, and the modular line jack.

As best seen in FIG. 7, the contact base plate 56' is positioned adjacent and substantially parallel to an interior surface 36' of the cup base 32', and has an interior surface facing the open end 42', and an opposite embedded surface 58'. The modular line jack 30' is fixedly attached to the embedded surface 58' of the contact base plate 56'. The center contacts 26', contact base plate 56', and modular line jack 30' are preassembled into an integral unit before attachment to the coupler cup 24'.

The second coupler contact of the alternatively preferred embodiment is a bell-shaped annular contact 74 positioned substantially parallel to the cup base 32'. The bell-shaped annular contact 74 has a first annular contacting element 60' and a second annular contacting element 62' connected by a continuous annular support 76. The first annular contacting element 60' is a flat, ring-like element positioned adjacent to the interior surface 36' of the cup base 32', and has an interior circumferential edge surface to which the continuous annular support 76 is fixedly attached. The continuous annular support 76 is a conical section having an axis of symmetry coaxial with the longitudinal axis of the coupler cup 24'. The continuous annular support 76 extends from the interior circumferential edge of the first annular contacting element 60' to an exterior circumferential edge of the second contacting element 62'. The second contacting element 62' is a flat, ring-like element positioned at a preset distance from the cup base 32' toward the open end 42'. The second annular contacting element 62' is supported by the continuous annular support 76, which is fixedly attached to the exterior circumferential edge of the second annular contacting element. Interior and exterior diameters of the first annular contacting element 60' are greater than interior and exterior diameters, respectively, of the second annular contacting element 62'.

Centers of the first and second annular contacting elements 60' and 62' are positioned substantially along the longitudinal axis of the coupler cup 24'. The interior diameters of the first and second annular contacting elements 60' and 62' are such that the interior circumferential edges of the annular contacting elements are separated from the center contact 26' to prevent unintended shortcircuits between the center and annular contacts 26' and 74. For ease of manufacturing, the first and second annular contacting elements 60' and 62' and the continuous annular support 76 are integrally fabricated as the annular contact 74 from a single piece of conducting material, such as aluminum or copper.

The exterior circumferential edge of the first annular contacting element 60' is held in position adjacent the interior surface 36' of the cup base 32' by a circumferential inset 80 in the interior surface of the cup wall 34'. The circumferential inset 80 has a diameter equal to the exterior diameter of the first annular contacting element 60', and extends from the interior surface 36' of the cup base 32' toward the open end 42' for a distance substantially equal to a thickness of the first annular contacting element 60'. The circumferential inset 80 in the cup wall 34' holds the annular contact 74 against the cup base 32' without the use of rivets or other fasteners, and allows more rapid assembly of the modular coupler 10'.

The modular line jack 30' of the alternatively preferred embodiment is positioned substantially along the longitudinal axis of the coupler cup 24'. A base end 66' of the modular line jack 30' is fixedly attached to the embedded surface 58' of the contact base plate 56'. The modular line jack 30' extends through the cup base 32' to an exposed end 70' of the modular line jack. The modular line jack 30' is held in position by four cup flanges 82. The cup flanges 82 are fixedly attached to the exterior surface 37' of the cup base, and extend perpendicularly therefrom for a preset distance. The four cup flanges 82 are positioned adjacent each of four sides 84 of the modular line jack 30'. A ridge 86 extending from two opposite sides 84 of the modular line jack 30' abut free ends of two opposite cup flanges 82, and hold the modular line jack 30' firmly in position.

The preassembled unit comprising the center contact 26', contact base plate 56', and modular line jack 30' is held in position both by the ridges 86 abutting the cup flanges 82 and by the annular contact 74, which contacts each of four corners of the contact base plate 56'. In assembly, the preassembled unit comprising the center contact 26', contact base plate 56', and modular line jack 30' is first inserted through the cup base 32' until the cup flanges 82 engage the ridges 86 of the walls 84 of the modular line jack 30'. Then the annular contact 76 is positioned adjacent the interior surface 36' of the cup base 32' by inserting the exterior circumferential edge 78 into the continuous inset 80 of the cup wall 34'. Such assembly is rapid and efficient, and produces a modular coupler 10' having exceptional durability.

It will be appreciated that, although specific embodiments of the invention have been described herein for purposes of illustration, various modifications may be made without departing from the spirit and scope of the invention. Accordingly, the invention is not limited except as by the appended claims.

I claim:

1. A telephone mouthpiece modular coupler for directly connecting a modular telephone line cord such as is attached to a direct-connect type modem, to a conventional non-modular telephone unit, such as those manufactured by Bell, GTE and ITE, having electrical contacts in a telephone handset comprising:
a coupler cup for attachment to an exposed mouthpiece of the telephone handset having a circular cup base and a substantially cylindrical cup wall rigidly attached to the cup base;

two or more electrical coupler contacts positioned in an interior portion of the coupler cup to create electrical connections to two or more mouthpiece contacts located in the mouthpiece of the telephone handset, the coupler contacts comprising a center contact positioned substantially along a longitudinal axis of the coupler cup, and an annular contact positioned substantially coaxially with the longitudinal axis of the coupler cup; and a modular telephone line jack fixedly attached to the coupler cup and capable of creating electrical connections between the coupler contacts and one or more conductors of the telephone cord.

2. The modular coupler of claim 1 wherein the center contact has a center contacting element positioned at a predetermined distance from the cup base toward an open end of the coupler cup.

3. The modular coupler of claim 2 wherein the center contacting element is rigidly attached to a center support extending between the center contacting element and the cup base.

4. The modular coupler of claim 3 wherein the center support is fixedly attached to a contact conductor plate positioned adjacent to the cup base.

5. The modular conductor of claim 1 wherein the center contact has a first center contacting element positioned substantially parallel to the cup base at a predetermined distance from the cup base toward the open end of the coupler cup, and a second center contacting element extending a predetermined distance from the first center contacting element toward the open end of the coupler cup.

6. The modular coupler of claim 5 wherein the second center contacting element terminates in a flat triangular portion oriented at a predetermined angle to the longitudinal axis of the coupler cup.

7. The modular coupler of claim 5 wherein the second center contacting element is a flat, substantially rectangular element oriented substantially perpendicular to the first center contacting element.

8. The modular coupler of claim 7 wherein a center of the first center contacting element is positioned substantially along the longitudinal axis of the coupler cup, and the first center contacting element is rigidly attached to a center support extending between the first center contacting element and the surface of the cup base.

9. The modular coupler of claim 8 wherein the first and second center contacting elements and the center support are integrally fabricated as the center contact from a single piece of conducting material.

10. The modular coupler of claim 1 wherein the annular contact has an annular contacting element positioned at a predetermined distance from the cup base toward the open end of the coupler cup.

11. The modular coupler of claim 1 wherein the annular contact has a first annular contacting element adjacent and substantially parallel to the cup base.

12. The modular coupler of claim 11 wherein the annular contact further has a second annular contacting element positioned substantially parallel to the cup base at a predetermined distance from the cup base toward the open end of the coupler cup.

13. The modular coupler of claim 12 wherein the second annular contacting element is supported by a cantilevered support rigidly attached to and connecting the first and second annular contacting elements.

14. The modular coupler of claim 13 wherein interior and exterior diameters of the first annular contacting element are greater than interior and exterior diameters, respectively, of the second annular contacting element.

15. The modular coupler of claim 14 wherein the first and second annular contacting elements and the cantilevered support are integrally fabricated as the annular contact from a single piece of conducting material.

16. The modular coupler of claim 12 wherein the second annular contacting element is supported by a continuous annular support rigidly attached to and connecting the first and second annular contacting elements.

17. The modular coupler of claim 16 wherein the continuous annular support is a conical section and where interior and exterior diameters of the first annular contacting element are greater than interior and exterior diameters, respectively, of the second annular contacting element.

18. The modular coupler of claim 17 wherein the first and second annular contacting elements and the continuous annular support are integrally fabricated as the annular contact from a single piece of conducting material.

19. A telephone mouthpiece modular coupler for directly connecting a modular telephone line cord such as is attached to a direct-connect type modem, to a conventional non-modular telephone unit, such as those manufactured by Bell, GTE and ITE, having electrical contacts in a telephone handset, comprising:
 a coupler cup for attachment to an exposed mouthpiece of the telephone handset having a circular cup base and a substantially cylindrical cup wall rigidly attached to the cup base;
 two or more electrical coupler contacts positioned in an interior portion of the coupler cup to create electrical connections to two or more mouthpiece contacts located in the mouthpiece of the telephone handset; and
 a modular telephone line jack fixedly attached to the coupler cup and capable of creating electrical connections between the coupler contacts and one or more conductors of the telephone line cord, the modular line jack being positioned with a longitudinal axis of a clip receptacle of the modular line jack substantially coaxial with a longitudinal axis of the coupler cup, and with the clip receptacle positioned exterior of the cup base.

20. The modular coupler of claim 19 wherein a contact base plate having electrically conducting paths connecting contact pins of the modular line jack to the coupler contacts is positioned adjacent to the cup base.

21. The modular coupler of claim 20 wherein the modular line jack, contact base plate, and at least one coupler contact are preassembled into a single unit.

22. The modular coupler of claim 19 wherein the modular line jack is held in position by cup flanges rigidly attached to and perpendicular to an exterior surface of the cup base.

23. A telephone mouthpiece modular coupler for directly connecting a modular telephone line cord, such as is connected to a direct-connect type data communications modem, to a conventional non-modular telephone unit, such as those manufactured by Bell, GTE and ITE, having electrical contacts in a telephone handset, comprising:
 a substantially cylindrical coupler cup for attachment to the mouthpiece of the telephone handset, having a circular cup base and a substantially cylindrical cup wall rigidly attached to the cup base;

a center coupler contact positioned substantially along a longitudinal axis of the coupler cup, having:
- a first center contacting element positioned substantially parallel to the cup base at a predetermined distance from the cup base toward an open end of the coupler cup,
- a center support rigidly attached to the first center contacting element and extending between the first center contacting element and the cup base, and
- a second center contacting element substantially perpendicular to the first center contacting element and extending therefrom toward the open end of the coupler cup, and terminating in a triangular portion oriented at a predetermined angle to the longitudinal axis of the coupler cup;

an annular coupler contact having:
- a first annular contacting element positioned adjacent and substantially parallel to the cup base,
- a second annular contacting element positioned substantially parallel to the cup base at a predetermined distance from the cup base toward the open end of the coupler cup, and
- a cantilevered support rigidly attached to and connecting the first and second annular contacting elements; and a modular line jack having contact pins electrically connected to the coupler contacts, and positioned with a longitudinal axis of a clip receptacle of the modular line jack substantially coaxial with the longitudinal axis of the coupler cup, and with the clip receptacle positioned exterior of the cup base.

24. A telephone mouthpiece modular coupler for directly connecting a modular telephone line cord, such as is directly connected to a direct-connect type data communications modem, to a conventional non-modular telephone unit, such as those manufactured by Bell, GTE and ITE, having electrical contacts in a telephone handset, comprising:

a substantially cylindrical coupler cup for attachment to the mouthpiece of the telephone handset, having a circular cup base and a substantially cylindrical cup wall rigidly attached to the cup base;

a center coupler contact positioned substantially along a longitudinal axis of the coupler cup, having:
- a first center contacting element positioned substantially parallel to the cup base at a predetermined distance from the cup base toward an open end of the coupler cup,
- a center support rigidly attached to the first center contacting element and extending between the first center contacting element and the cup base, and
- a flat, substantially rectangular second center contacting element substantially perpendicular to the first center contacting element and extending therefrom toward the open end of the coupler cup;

an annular coupler contact having:
- a first annular contacting element positioned adjacent and substantially parallel to the cup base,
- a second annular contacting element positioned substantially parallel to the cup base at a predetermined distance from the cup base toward the open end of the coupler cup, and having interior and exterior diameters smaller than interior and exterior diameters, respectively, of the first center contacting element, and
- a continuous annular support having substantially the shape of a conical section, and rigidly attached to and connecting the first and second annular contacting elements; and a modular line jack having contact pins electrically connected to the coupler contacts, and positioned with a longitudinal axis of a clip receptacle of the modular line jack substantially coaxial with the longitudinal axis of the coupler cup, and with the clip receptacle positioned exterior of the cup base.

* * * * *